(12) United States Patent
Guo et al.

(10) Patent No.: US 12,132,374 B2
(45) Date of Patent: Oct. 29, 2024

(54) ELECTRIC MOTOR AND WASHING MACHINE

(71) Applicants: FOSHAN WELLING WASHER MOTOR MANUFACTURING CO., LTD., Guangdong (CN); HUAI'AN WELLING MOTOR MANUFACTURING CO., LTD., Jiangsu (CN)

(72) Inventors: Bingchun Guo, Guangdong (CN); Minghu Yu, Guangdong (CN)

(73) Assignees: FOSHAN WELLING WASHER MOTOR MANUFACTURING CO., LTD., Foshan (CN); HUAI'AN WELLING MOTOR MANUFACTURING CO., LTD., Jiangsu (CN)

( * ) Notice: Subject to any disclaimer, the term of this patent is extended or adjusted under 35 U.S.C. 154(b) by 402 days.

(21) Appl. No.: 17/682,500

(22) Filed: Feb. 28, 2022

(65) Prior Publication Data

US 2022/0181944 A1    Jun. 9, 2022

Related U.S. Application Data

(63) Continuation of application No. PCT/CN2020/137616, filed on Dec. 18, 2020.

(30) Foreign Application Priority Data

Sep. 15, 2020   (CN) .......................... 202010969965.7
Sep. 15, 2020   (CN) .......................... 202022023467.1
Sep. 15, 2020   (CN) .......................... 202022024611.3

(51) Int. Cl.
    *H02K 5/10*           (2006.01)

(52) U.S. Cl.
    CPC ........... *H02K 5/10* (2013.01); *H02K 2213/03* (2013.01)

(58) Field of Classification Search
    CPC ........................... H02K 2213/03; H02K 5/10
    See application file for complete search history.

(56) References Cited

U.S. PATENT DOCUMENTS

| 4,668,898 A | 5/1987 | Harms et al. |
| 6,037,726 A | 3/2000 | Tabata et al. |

(Continued)

FOREIGN PATENT DOCUMENTS

| CN | 102801253 A | 11/2012 |
| CN | 102904354 A | 1/2013 |

(Continued)

OTHER PUBLICATIONS

Request for the Submission of an Opinion dated Sep. 12, 2023 received in Korean Patent Application No. KR 10-2022-7006870.

(Continued)

*Primary Examiner* — Forrest M Phillips
(74) *Attorney, Agent, or Firm* — Scully, Scott, Murphy & Presser, P.C.

(57) ABSTRACT

The present application provides an electric motor and a washing machine. The electric motor includes a first end cover, a second end cover, a fastener configured for connecting the first end cover and the second end cover, a stator assembly and a rotor assembly. The stator assembly and the rotor assembly are arranged in a chamber enclosed by the first end cover and the second end cover. The first end cover is provided with a first flange portion, the second end cover is provided with a second flange portion, and a support installation portion is provided between the first flange portion and the second flange portion. The fastener is used (Continued)

to fasten the first flange portion, the support installation portion and the second flange portion.

19 Claims, 9 Drawing Sheets

(56) References Cited

U.S. PATENT DOCUMENTS

| | | | | |
|---|---|---|---|---|
| 9,021,839 | B2* | 5/2015 | Lee | H02K 1/32 |
| | | | | 68/3 R |
| 2003/0107279 | A1* | 6/2003 | Yang | H02K 5/04 |
| | | | | 310/89 |
| 2007/0257568 | A1 | 11/2007 | Akita et al. | |
| 2009/0096305 | A1* | 4/2009 | Marioni | D06F 37/304 |
| | | | | 310/91 |
| 2010/0019629 | A1 | 1/2010 | Amaya et al. | |
| 2012/0096902 | A1 | 4/2012 | Major et al. | |
| 2014/0091672 | A1 | 4/2014 | Yamada et al. | |
| 2015/0040618 | A1* | 2/2015 | Lee | H02K 5/04 |
| | | | | 310/91 |
| 2016/0056681 | A1* | 2/2016 | Major | H02K 5/18 |
| | | | | 310/64 |

FOREIGN PATENT DOCUMENTS

| | | | |
|---|---|---|---|
| CN | 202721533 U | 2/2013 | |
| CN | 103580356 A | 2/2014 | |
| CN | 103748768 A | 4/2014 | |
| CN | 203660711 U | 6/2014 | |
| CN | 203883586 U | 10/2014 | |
| CN | 203933222 U | 11/2014 | |
| CN | 104682607 A | 6/2015 | |
| CN | 204733005 U | 10/2015 | |
| CN | 204794453 U | 11/2015 | |
| CN | 204794462 U | 11/2015 | |
| CN | 205039640 U | 2/2016 | |
| CN | 105386278 A | 3/2016 | |
| CN | 105391224 A | 3/2016 | |
| CN | 106253572 A | 12/2016 | |
| CN | 104158333 B | 11/2017 | |
| CN | 107313948 A | 11/2017 | |
| CN | 206962600 U | 2/2018 | |
| CN | 108551223 A | 9/2018 | |
| CN | 208489737 U | 2/2019 | |
| CN | 109962541 A | 7/2019 | |
| CN | 110768474 A | 2/2020 | |
| CN | 210273657 U | 4/2020 | |
| CN | 212343506 U | 1/2021 | |
| CN | 212751976 U | 3/2021 | |
| CN | 212935583 U | 4/2021 | |
| DE | 608371 C | 1/1935 | |
| DE | 102010062822 A1* | 6/2012 | D06F 37/206 |
| DE | 102010062824 A1 | 6/2012 | |
| EP | 0610570 A1 | 8/1994 | |
| EP | 1109292 A2 | 6/2001 | |
| FR | 2155181 A5 | 5/1973 | |
| GB | 2305023 A | 3/1997 | |
| JP | S60-202116 A | 10/1985 | |
| JP | H01321848 A | 12/1989 | |
| JP | H07212993 A | 8/1995 | |
| JP | H08223846 A | 8/1996 | |
| JP | H08266001 A | 10/1996 | |
| JP | 2001251806 A | 9/2001 | |
| JP | 2005304213 A | 10/2005 | |
| JP | 2006211835 A | 8/2006 | |
| JP | 2007306751 A | 11/2007 | |
| JP | 2011155738 A | 8/2011 | |
| JP | 2020054628 A | 4/2020 | |
| KR | 20130063212 A | 6/2013 | |
| WO | 2020071739 A1 | 4/2020 | |

OTHER PUBLICATIONS

International Search Report dated Jun. 16, 2021 received in International Application No. PCT/CN2020/137628.
Notice of Reasons for Refusal dated Apr. 25, 2023 received in Japanese Patent Application No. JP 2022-513595.
Notification of the Third Office Action dated Sep. 18, 2023 received in Chinese Patent Application No. CN 202111453046.5.
Extended European Search Report dated Oct. 31, 2022 received in European Patent Application No. EP 20950480.2.
Notification of the Third Office Action dated May 31, 2023 received in Chinese Patent Application No. CN 202111453035.7.
Request for the Submission of an Opinion dated Nov. 30, 2023 received in Korean Patent Application No. KR 10-2022-7006919.
Notice of Final Rejection dated Nov. 20, 2023 received in Korean Patent Application No. KR 10-2022-7006870.
Notice of Reasons for Refusal dated Oct. 3, 2023 received in Japanese Patent Application No. JP 2022-513594.
International Search Report dated Jun. 16, 2021 received in International Application No. PCT/CN2020/137616.
Notice of Reasons for Refusal dated Apr. 25, 2023 received in Japanese Patent Application No. JP 2022-513594.
Extended European Search report dated Nov. 4, 2022 received in European Patent Application No. EP 20950481.0.
Notification of the First Office Action dated Nov. 23, 2022 received in Chinese Patent Application No. CN 202010969965.7.
First Office Action dated Nov. 9, 2022 received in Chinese Patent Application No. CN 202111453046.5.
First Office Action dated Nov. 1, 2022 received in Chinese Patent Application No. CN 202111453035.7.
Notification of the Second Office Action dated Mar. 11, 2023 received in Chinese Patent Application No. CN 202111453035.7.
Notification of the Second Office Action dated Mar. 11, 2023 received in Chinese Patent Application No. CN 202010969965.7.
Decision of Rejection dated Apr. 29, 2023 received in Chinese Patent Application No. CN 202010969965.7.
Second Office Action dated May 27, 2023 received in Chinese Patent Application No. CN 202111453046.5.
Decision of Rejection dated May 31, 2023 received in Chinese Patent Application No. CN 202111453035.7.
Notice of Submission of Opinions dated Nov. 30, 2023 received in Korean Patent Application No. KR 10-2022-7006919.

* cited by examiner

ELECTRIC MOTOR AND WASHING MACHINE

CROSS-REFERENCE TO RELATED APPLICATIONS

This application is a continuation application of PCT International Application No. PCT/CN2020/137616 filed on Dec. 18, 2020, which claims priority to and benefits of Chinese Patent Applications No. 202010969965.7, No. 202022023467.1 and No. 202022024611.3, all filed on Sep. 15, 2020, the entire contents of which are incorporated herein by reference for all purposes. No new matter has been introduced.

FIELD

The present application relates to the field of household appliances, and in particular to an electric motor and a washing machine.

BACKGROUND

At present, the cost of electric motors is high. In order to reduce the cost of electric motors, stretched or injection-molded end covers can be used to replace cast end covers, which can not only reduce the cost of raw materials, but also reduce the cost of production processes. However, the stretched or injection molded end covers, due to the thin wall thickness thereof, is prone to deformation under pressure during assembly, resulting in an unstable connection structure of the end covers.

SUMMARY

An object of embodiments of the present application is to provide an electric motor and a washing machine, aiming at solving at least the problem that the stretched or injection-molded motor end covers are prone to deformation under pressure.

According to an aspect of the present application, an electric motor is provided. The electric motor includes a first end cover, a second end cover, a fastener configured for connecting the first end cover and the second end cover, a stator assembly and a rotor assembly. The stator assembly and the rotor assembly are arranged in a chamber enclosed by the first end cover and the second end cover. The first end cover is provided with a first flange portion, the second end cover is provided with a second flange portion, and a support installation portion is provided between the first flange portion and the second flange portion. The fastener is configured to fasten the first flange portion, the support installation portion and the second flange portion.

In one embodiment, an inner wall of the first end cover has a first mating surface, an outer periphery of the stator assembly has a second mating surface, and the first mating surface abuts the second mating surface.

In one embodiment, an end surface of the first flange portion facing the support installation portion is a third mating surface, a surface of the support installation portion facing the third mating surface is a fourth mating surface. A distance between the end surface of the stator assembly inside the first end cover and the third mating surface is H1, and a thickness of the stator component is H2, where, $H1>2$ mm, $H2<60$ mm, and $H1<H2$.

In one embodiment, the stator assembly includes a middle iron core, a first side iron core and a second side iron core. The first side iron core and the second side iron core are respectively disposed on opposite sides of the middle iron core, and the support installation portion is formed by extending the middle iron core outwardly in a radial direction.

In one embodiment, the first side iron core is arranged in the first end cover, the second side iron core is arranged in the second end cover, an outer periphery of the second side iron core has an arc-shaped fifth mating surface, an inner wall of the second end cover has an arc-shaped sixth mating surface, and central axes of the fifth mating surface and the sixth mating surface coincide with each other.

In one embodiment, the first flange portion is provided with a first connection hole, the support installation portion is provided with a second connection hole, and the second flange portion is provided with a third connection hole. The fastener is arranged to be extended into the first connection hole, the second connection hole and the third connection hole.

In one embodiment, the number of the support installation portions is three, and on a plane where a side of the support installation portion facing the first flange portion is presented, included angles between two adjacent lines connecting a center point of the second connection hole and a center point of the stator assembly is A1, A2 and A3 in sequence, wherein $A1+A2+A3=360°$, $10°<A1<175°$, $60°<A2<200°$.

In one embodiment, a triangle formed by lines connecting three center points of the second connection holes is a non-equilateral triangle.

In one embodiment, where $A1=90±5°$, $A2=A3=135±5°$.

In one embodiment, the maximum distance between an outer edge of the support installation portion and a center of the stator assembly is D1, and a distance between a center of the second connection hole and the center of the stator assembly is D2, where $0.5<D2/D1<1$.

In one embodiment, an outer side of the second end cover is provided with a first installation foot configured for connecting with an external structure, and part of the second flange portion is integrally formed with the first installation foot, and the third connection hole is defined in the first installation foot.

In one embodiment, the outer side of the second end cover is provided with a water baffle configured for blocking water, and the water baffle is connected to a side wall of the first installation foot.

In one embodiment, the support installation portion can be a support block, a side of the support installation portion facing the second flange portion has a first positioning portion, the second flange portion is correspondingly provided with a second positioning portion, and the first positioning portion and the second positioning portions are plugged into each other.

In one embodiment, the support installation portion is integrally formed with the first flange portion or the second flange portion.

In one embodiment, the support installation portion is formed separately from the first flange portion and the second flange portion.

In one embodiment, a side of the support block facing the second flange portion has a third positioning portion, and the second flange portion is provided with a fourth positioning portion. The third positioning portion and the fourth positioning parts are plugged into each other.

In one embodiment, the first end cover is made of a metal material, a bulk molding compound or a resin material.

In one embodiment, the electric motor further includes a controller and a controller cover, the controller is arranged inside the controller cover, the controller cover is fixedly connected to the first end cover, and a side of the controller cover facing away from the first end cover has a second installation foot configured for connecting with an external structure.

According to another aspect of the present application, a washing machine is provided, which includes the electric motor as aforementioned.

Beneficial effects of the electric motor provided by the embodiments of the present application include but are not limited to the following. When the first end cover is formed through stretching or injection molding and has a thin wall thickness and low strength, the first end cover and the second end cover are respectively provided with a first flange portion and a second flange portion, both configured for connecting the fastener. By providing a support installation portion between the first flange portion and the second flange portion, the first end cover can be prevented from being squeezed and deformed during assembly.

Beneficial effects of the washing machine provided by the embodiments of the present application are that the washing machine of the present application uses the above-mentioned electric motor. The electric motor includes a first end cover, a second end cover, a fastener configured for connecting the first end cover and the second end cover, a stator assembly and a rotor assembly. When the first end cover is formed through stretching or injection molding and has a thin wall thickness and low strength, the first end cover and the second end cover are respectively provided with a first flange portion and a second flange portion, both configured for connecting the fastener. By providing a support installation portion between the first flange portion and the second flange portion, the first end cover can be prevented from being squeezed and deformed during assembly.

BRIEF DESCRIPTION OF THE DRAWINGS

In order to illustrate the embodiments of the present application more clearly, the following will briefly introduce the drawings needed in description of the embodiments or demonstration technologies. Obviously, the drawings in the following description are merely some embodiments of the present application. For those of ordinary skill in the art, other drawings may be obtained based on these drawings on the premise of paying no creative labor.

Figure 1:
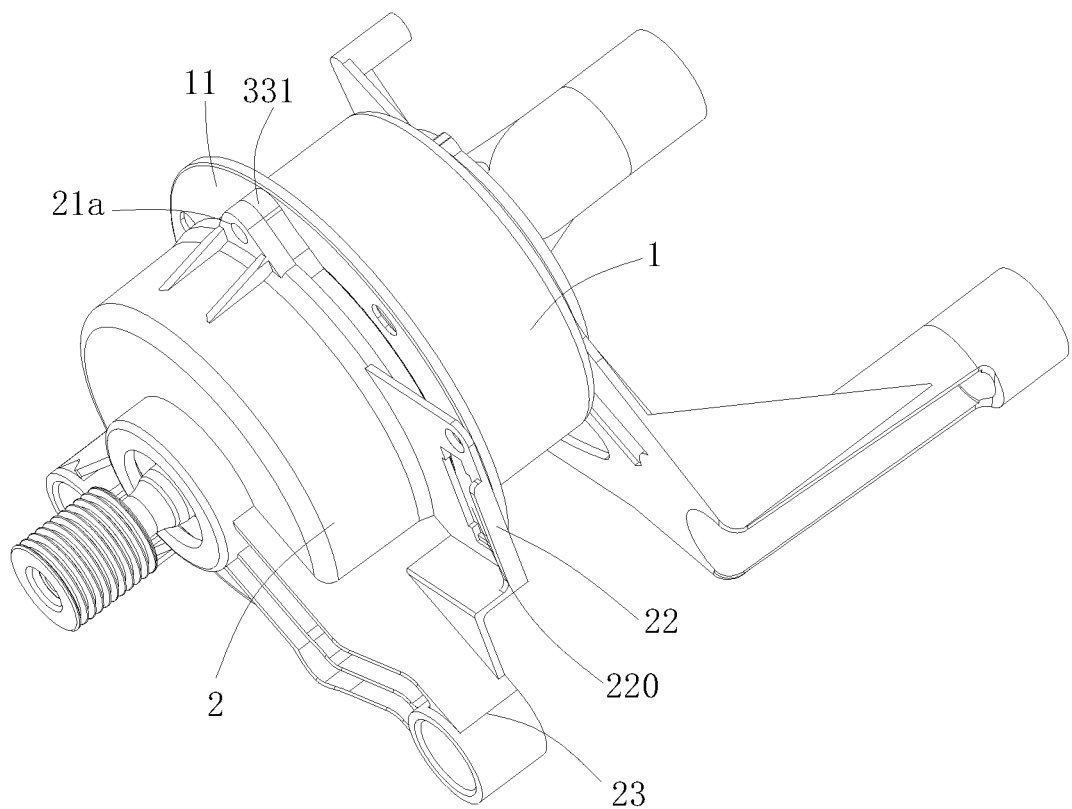
FIG. 1 is a three-dimensional structural view of an electric motor of a first type in accordance with an embodiment of the present application.

Among them, each reference sign in the figures is listed as follows:

1—first end cover; 11—first flange portion; 110—first connection hole; 111—third mating surface; 12—first mating surface; 2—second end cover; 21a, 21b—second flange portion; 210—third connection hole; 22—water baffle; 220—terminal box installation portion; 23—first installation foot; 24—sixth mating surface; 25—outlet port; 3a, 3b—stator assembly; 31—first side iron core; 311—second mating surface; 32—second side iron core; 321—fifth mating surface; 33—middle iron core; 331—support installation portion; 3310—second connection hole; 3311—fourth mating surface; 4—rotor assembly; 5—controller cover; 51—second installation foot; and 6—support block.

DETAILED DESCRIPTION OF EMBODIMENTS

In order to illustrate the objects, technical solutions and advantages of the present application more clearly, the present application will be further described in detail below with reference to the drawings and embodiments. It should be understood that the embodiments specifically described herein are used only to explain the present invention, and are not intended to limit the present application.

It should be noted that when a component is referred to as being "fixed to" or "disposed on" another component, it may be directly or indirectly on the other component. When an element is referred to as being "connected to" another element, it may be directly or indirectly connected to the other element. Orientation or positional relationship indicated by the terms "upper," "lower," "left," "right," etc. is based on the orientation or positional relationship shown in the drawings, for convenience of description, rather than indicating or implying the device or element referred to must have a specific orientation, be constructed and operated in a specific orientation, it thus should not be understood as limitations to the present application, and those of ordinary skill in the art can understand the specific meanings of the above terms according to specific situations. The terms "first" and "second" are only used for purpose of description, and should not be understood as indicating or implying relative importance or implicitly indicating the number of technical features. The phase of "a plurality of" means two or more, unless expressly and specifically defined otherwise.

In order to illustrate the technical solutions provided in the present application, the following detailed description is made in combination with the specific drawings and embodiments.

Figure 2:
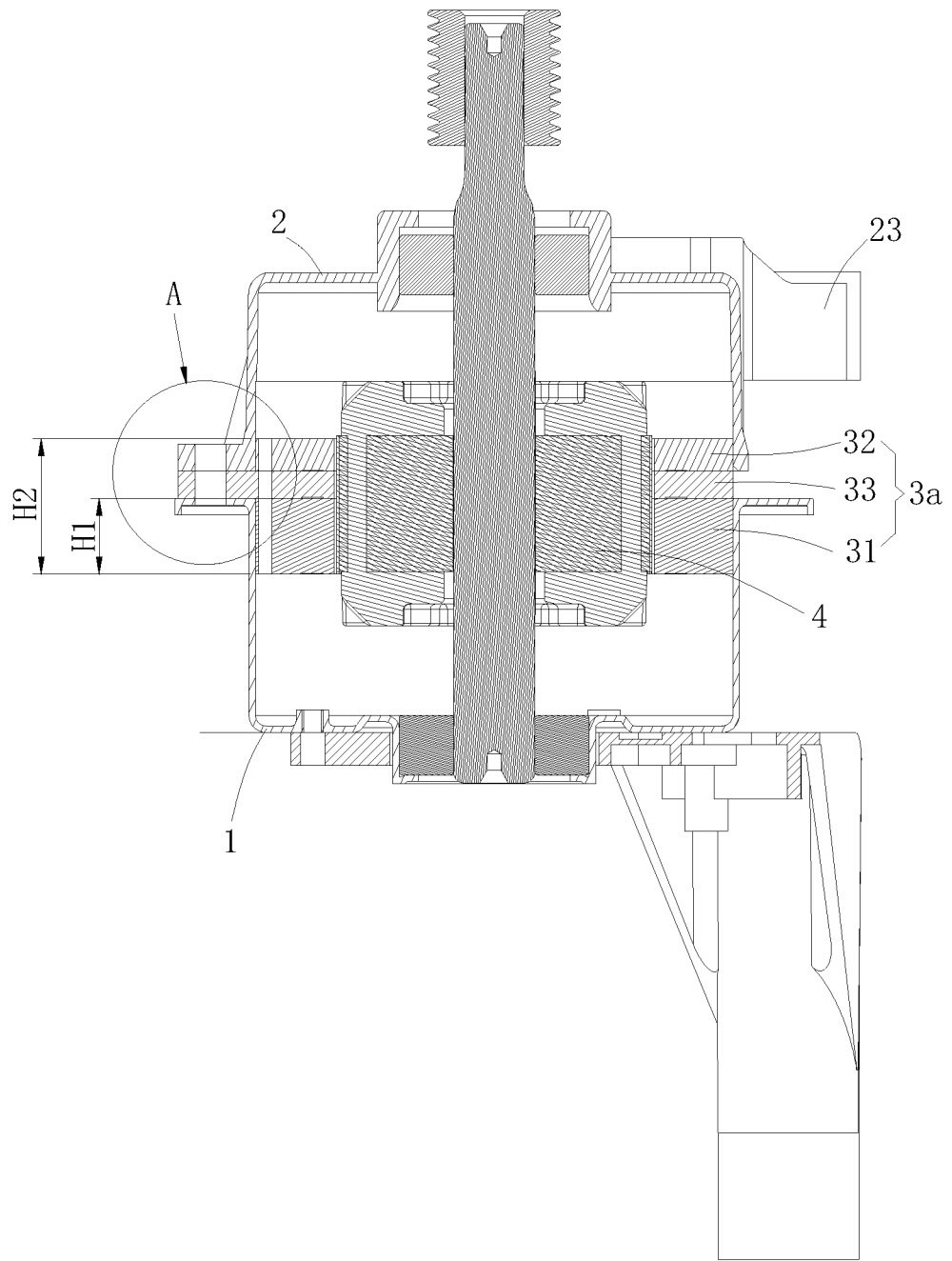
FIG. 2 is a cross-sectional view of the electric motor of the first type in accordance with an embodiment of the present application.
Figure 3:
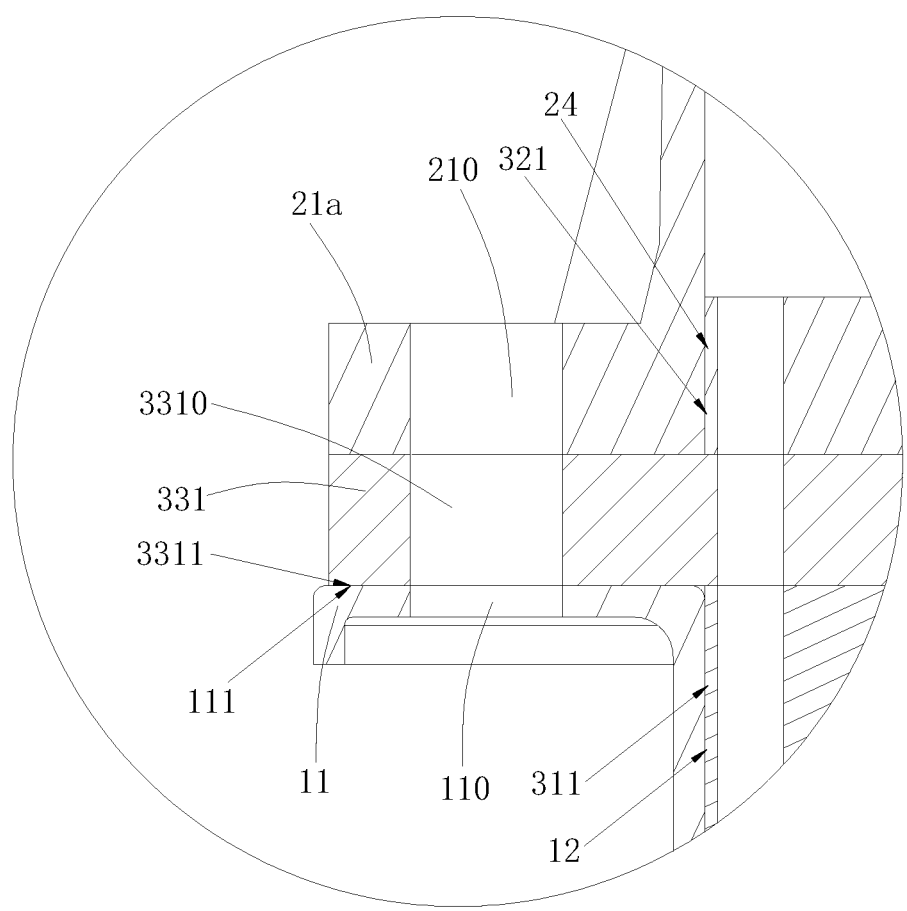
FIG. 3 is a partial enlarged view of part A taken from FIG. 2.

Referring to FIGS. 1 to 3, in an exemplary embodiment of the present application, the electric motor may include a first end cover 1, a second end cover 2, a fastener, a stator assembly 3a and a rotor assembly 4. The first end cover 1 and the second end cover 2 are fixedly connected through the fastener. The stator assembly 3a is arranged at an outer periphery of the rotor assembly 4. Both the stator assembly 3a and the rotor assembly 4 are arranged in a chamber enclosed by the first end cover 1 and the second end cover 2. One end of the first end cover 1 close to the second end cover 2 extends outwardly in a radial direction to form a first flange portion 11, and one end of the second end cover 2 close to the first end cover 1 extends outwardly in a radial direction to form a second flange portion 21a. The first flange portion 11 the second flange portion 21a are aligned with each other. Optionally, the first end cover 1 is formed through stretching or injection molding, has relatively thin wall thickness and relatively low strength, and is therefore easy to be squeezed and deformed during assembly. A support installation portion 331 is provided between the first flange portion 11 and the second flange portion 21a. The arrangement of the support installation portion 331 has a supporting effect on the first flange portion 11 of the first end cover 1, which can prevent the first flange portion 11 from being pressed and deformed. The fastener can provide a fixed connection between the first flange portion 11, the support installation portion 331, and the second flange portion 21a, thereby achieving a fixed connection between the first end cover 1 and the second end cover 2. The fastener may be selected from screws, pins and the like.

Optionally, an inner wall of the first end cover 1 has a first mating surface 12, an outer periphery of the stator assembly 3a has a second mating surface 311, and the first mating surface 12 and the second mating surface 311 abut against each other, so that the first end cover 1 is wrapped around the outer circumference of the stator assembly 3a, thereby providing a supporting effect on the stator assembly 3a, which may indirectly strengthen the strength of the stator assembly 3a, and prevent the stator assembly 3a from vibrating to generate noise when the electric motor is working, thereby reducing the noise of the electric motor.

Figure 4:
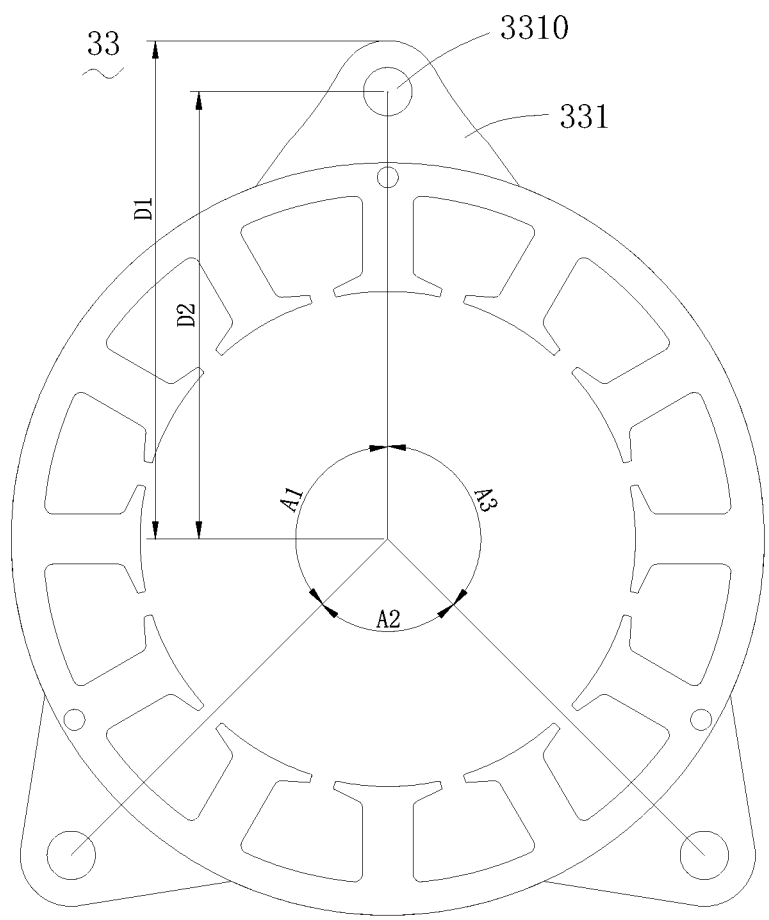
FIG. 4 is a front view of a middle iron core shown in FIG. 2.

In this embodiment, referring to FIG. 2 and FIG. 4, an end surface of the first flange portion 11 facing the support installation portion 331 is a third mating surface 111, and a surface of the support installation portion 331 facing the first flange portion 11 is a fourth mating surface 3311. The third mating surface 111 and the fourth mating surface 3311 are contacted with each other, so as to realize supporting of the first flange portion 11 by the support installation portion 33. A distance between the end surface of the stator assembly 3a inside the first end cover 1 and the third mating surface 111 is H1, and a thickness of the stator assembly 3a is H2, where H1>2 mm, H2<60 mm. The stator assembly 3a is arranged to have an axial length of at least 2 mm being fitted with the first end cover 1 (that is, a fitting length of the first mating surface 12 and the second mating surface 311 is at least 2 mm), so as to ensure a noise reduction effect of the first end cover 1 on the stator assembly 3a. Moreover, by setting H1<H2, the stator assembly 3a is arranged to have a part being located in the first end cover 1 and a part being located in the second end cover 2, so that the first end cover 1 and the second end cover 2 both provide a wrapping effect on the stator assembly 3a.

In this embodiment, the stator assembly 3a includes a middle iron core 33, a first side iron core 31 and a second side iron core 32, and the first side iron core 31 and the second side iron core 32 are respectively provided on opposite sides of the middle iron core 33. The middle iron core 33, the first side iron core 31 and the second side iron core 32 are all formed by laminating a plurality of punching pieces. The middle iron core 33 radially extends to form the above-mentioned support installation portion 331, and the support installation portion 331 is sandwiched between the first flange portion 11 and the second flange portion 21a. The first flange portion 11 is supported by the middle iron core 33, and thus deformation of the first flange portion 11 can be prevented. Optionally, a plurality of first flange portion 11 and a plurality of second flange portion 21a may be distributed circumferentially on an outer periphery of the first end cover 1 and the second end cover 2 respectively. Accordingly, a plurality of support installation portion 331 are also provided.

The first side iron core 31 is disposed in the first end cover 1, an outer periphery of the first side iron core 31 has the above-mentioned second mating surface 311, and the inner wall of the first end cover 1 has the first mating surface 12. The first mating surface 12 and the second mating surface 311 are both arc-shaped, and central axes of the first mating surface 12 and the second mating surface 311 coincide with each other, so that the first mating surface 12 and the second mating surface 311 can be completely fitted. The first mating surface 12 and the second mating surface 311 are in an interference fit, so that the first end cover 1 has a supporting effect on the first side iron core 31. Optionally, the first mating surface 12 and the second mating surface 311 may be an annular surface composed of multiple spaced arc surfaces or may be an entirely annular surface. Here, specific structures of the first mating surface 12 and the second mating surface 311 are not limited. In other embodiments, the first mating surface 12 and the second mating surface 311 may also be surfaces in the shape of a square, a circle, a polygon, or the like.

The second side iron core 32 is located in the second end cover 2, an outer periphery of the second side iron core 32 has an arc-shaped fifth mating surface 321, and an inner side of the second end cover 2 has an arc-shaped sixth mating surface 24. Central axes of the fifth mating surface 321 and the sixth mating surface 24 coincide with each other, so that the fifth mating surface 321 and the sixth mating surface 24 can be completely fitted. The fifth mating surface 321 and the sixth mating surface 24 are in an interference fit, so that the second end cover 2 has a supporting effect on the second side iron core 32. Optionally, the fifth mating surface 321 and the sixth mating surface 24 may be annular surfaces composed of multiple spaced arc surfaces or may be an entirely annular surface. Here, the specific structures of the fifth mating surface 321 and the sixth mating surface 24 are not limited here. In other embodiments, the fifth mating surface 321 and the sixth mating surface 24 may also be surfaces in the shape of a square, a circle, a polygon, or the like.

Optionally, the first flange portion 11 is provided with a first connection hole 110, the support installation portion 331 is provided with a second connection hole 3310, the second flange portion 21a is provided with a third connection hole 210. The first connection hole 110, the second connection hole 3310, and the third connection hole 210 are arranged to be aligned with each other. The fastener is arranged to be extended into the first connection hole 110, the second connection hole 3310 and the third connection hole 210, so that the first end cover 1, the middle iron core 33 and the second end cover 2 are fixed to each other. The fastener may optionally be a screw, and the screw, passing through the first connection hole 110 and the second connection hole 3310, is threadedly connected to the third connection hole 210. The fastener may optionally be a pin, and the pin is configured to pass through the first connection hole 110, the second connection hole 3310 and the third connection hole 210.

Optionally, referring to FIG. 4, a plurality of support installation portions 331 are provided, and the support installation portions 331 are circumferentially arranged on circumference of the middle iron core 33. For example, three support installation portions 331 are provided, and correspondingly, three first flange portions 11 and three second flange portions 21a are also provided. Alternatively, one first flange portion 11 is provided having an annular shape, and one second flange portion 21a is provided having an annular shape. A center point of each second connection hole 3310 and a center point of the stator assembly 3a may form a connecting line, and included angles between two adjacent connecting lines are A1, A2, and A3 in sequence, A1+A2+A3=360°. That is, the three support installation portions 331 are circumferentially arranged on the circumference of the middle iron core 33. For example, 10°<A1<175°, 60°<A2<200°, so that the difference between A1, A2, and A3 is as small as possible, even if the support installation portions 331 are distributed more evenly. Optionally, A1, A2, and A3 are equal, and each support installation portion 331 is evenly arranged on the circumference of the middle iron core 33 in a circumferential direction.

Optionally, a triangle formed by lines connecting the center points of the three second connection holes 3310 is a non-equilateral triangle, that is, the three second connection holes 3310 are not uniformly arranged on a stator blade in the circumferential direction. When forming the stator blade, the incoming material is a material strip. At the same width position, at least two stator blades can be punched out. The second connection hole 3310 is asymmetrically arranged, so that waste on the material belt can be fully minimized. It is possible to punch out the stator blade with the support installation portion 331 without widening the material strip, which can save material.

Optionally, A1=90±5°, A2=A3=135±5°. Two stator blades may be designed in a width direction of the material strip, when A1=90±5°, A2=A3=135±5°, so that the remaining material strip between the stator blades can be fully used for the support installation portion 331, and at the remaining material strip, the support installation portion 331 is formed.

Optionally, the maximum distance between an outer edge of the support installation portion 331 and the center of the stator assembly 3a is D1, and a distance between the center of the second connection hole 3310 and the center of the stator assembly 3a is D2. For example, the line connecting the center point of the second connection hole 3310 and the center point of the stator assembly 3a extends to the outer edge of the support installation portion 331, and D1 is a distance from the intersection of the line and the outer edge of the support installation portion 331 to the center of the stator assembly 3a. For example, 0.5<D2/D1<1, a value of D2/D1 may be 0.6, 0.7, 0.8, 0.9, etc. When the value of D2/D1 is overly small, the material between the second connection hole 3310 and the outer edge of the support installation portion 331 is also overly small, which causes the hole wall of the second connection hole 3310 to be more prone to breakage. When the value of D2/D1 is overly large, the area of the support installation portion 331 is also overly large, and the area of the material strip to be occupied is thus overly large, which may lead to increased cost of raw materials. Therefore, the value of D2/D1 is in a range from 0.5 and 1.

Optionally, a side of the support installation portion 331 facing the second flange portion 21a has a first positioning portion, and the second flange portion 21a is correspondingly provided with a second positioning portion. The first positioning portion and the second positioning portion are plugged into each other, such that relative positions of the support installation portion 331 and the second flange portion 21a in the circumferential direction are fixed to prevent the stator assembly 3a from rotating. Outer contour shapes of the first positioning portion and the second positioning portion are matched. The first positioning portion may be a groove or a through hole, and the second positioning portion may be a convex rib, a convex column, etc.; or alternatively, the second positioning portion may be a groove or a through hole, and the first positioning portion may be a convex rib, a convex column, etc.

Among them, the first end cover 1 may be made of a metal material, a bulk molding material or a resin material. When the first end cover 1 is made of the metal material, the first end cover 1 may be formed through stretching, and when the first end cover 1 is made of the bulk molding compound, the resin material, etc., the first end cover 1 may be formed through injection molding. The bulk molding compound can be referred to as a BMC plastic, and the BMC plastic is a thermosetting plastic, in which various inert fillers, fiber reinforcements, catalysts, stabilizers and pigments are mixed to form an adhesive "putty-like" composite material for compression molding or injection molding.

In this embodiment, referring to FIG. 1 and FIG. 2, an outer wall of the second end cover 2 is extended forming the first installation foot 23, and the first installation foot 23 is configured to form a fixed connection with external structures such as a water storage bucket. Part of the second flange portion 21a is integrally formed with the first installation foot 23, and the third connection hole 210 is defined in the first installation foot 23.

Optionally, the outer side of the second end cover 2 has a first installation foot 23 and also has a water baffle 22. The first installation foot 23 and the water baffle 22 are both connected to the outer wall of the second end cover 2. The water baffle 22 is also connected to a side wall of the first installation foot 23, so that the water baffle 22, the outer wall of the second end cover 2 and the first installation foot 23 form a triangular-like structure, so that the arrangement of the water baffle 22 and the first installation foot 23 can be more stable. A function of the first installation foot 23 is to be fixedly connected with external structures such as a water storage bucket. The first installation foot 23 may be provided with other structures such as installation holes to facilitate connection with the external structures. The water baffle 22 is provided with a terminal box installation portion 220 for mounting a terminal box. The terminal box installation portion 220 may optionally be a structure of a through hole or a groove.

Figure 5:
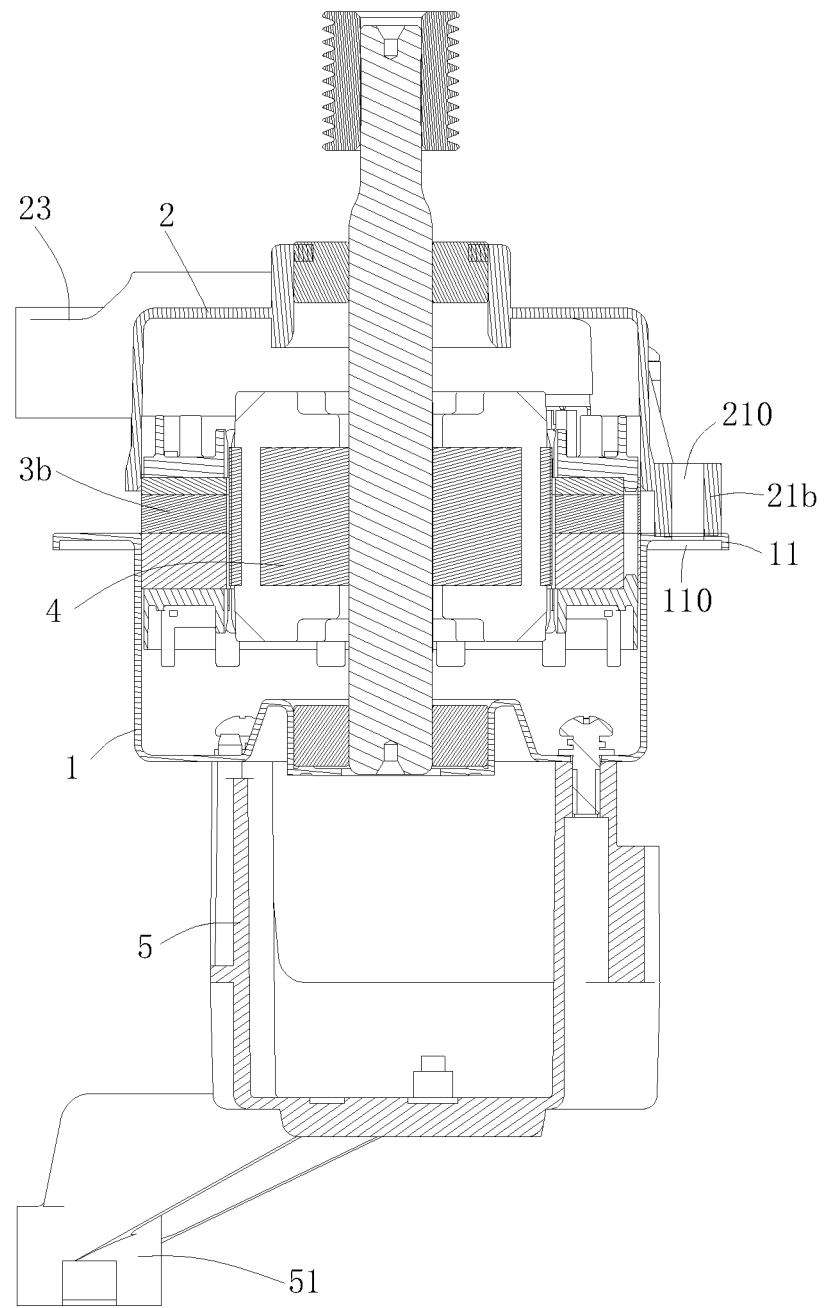
FIG. 5 is a cross-sectional view of an electric motor of a second type in accordance with an embodiment of the present application.
Figure 6:
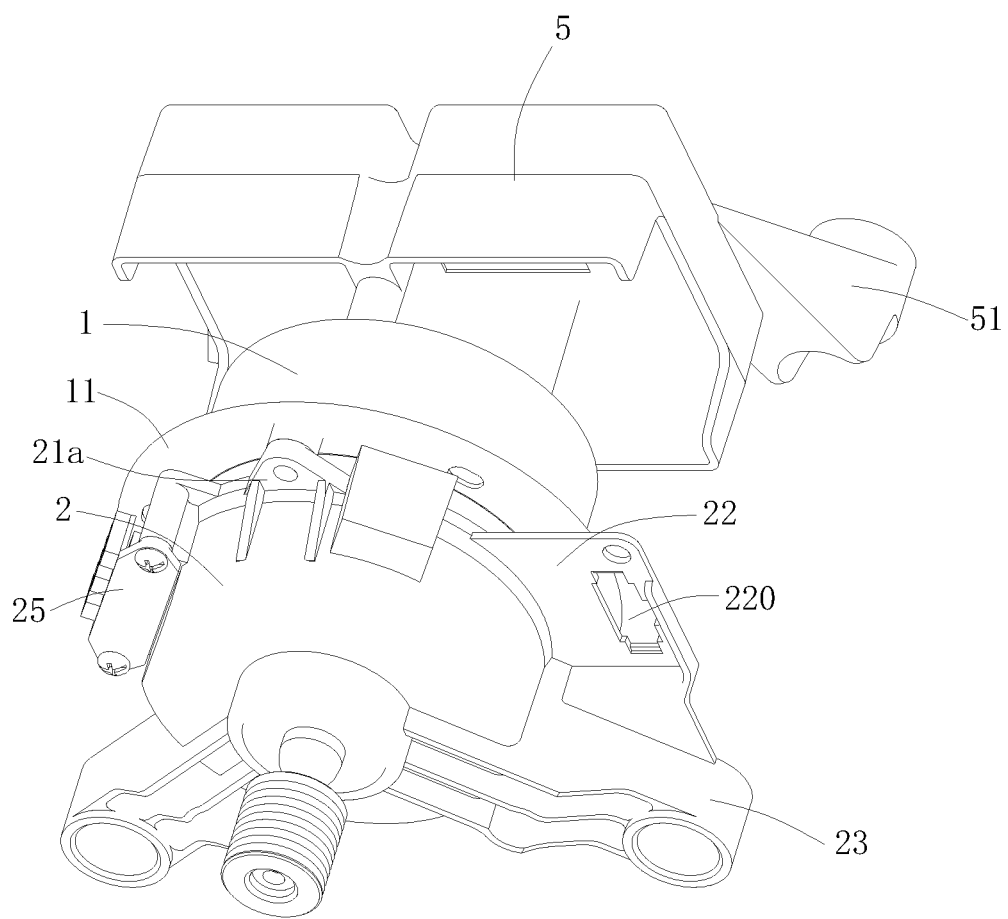
FIG. 6 is a three-dimensional structural diagram of an electric motor of a third type in accordance with an embodiment of the present application.

Referring to FIGS. 5 and 6, according to another exemplary embodiment of the present application, an electric motor is provided. The electric motor according to this embodiment differs from the previous embodiment in that: the support installation portion is integrally formed with the first flange portion or the second flange portion. That is, the support installation portion is formed by extending the second flange portion 21a in the previous embodiment toward the first flange portion 11; for forming the support installation portion (the second flange portion 21b) in this embodiment, the support installation portion is integrally formed with the second flange portion 21b, while supporting the first flange portion 11. Alternatively, the support installation portion is formed by extending the first flange portion 11 in the previous embodiment toward the second flange portion 21a; for forming the support installation portion in this embodiment, the support installation portion is integrally formed with the first flange portion 11. In this embodiment, the middle iron core of the stator assembly 3b does not require radial extension.

Optionally, the second end cover 2 is provided with an outlet port 25 for connecting with a controller or a washing machine. The outlet port 25 is disposed on the second end cover 2, and the strength of the second end cover 2 will not be reduced. When the outlet port 25 is arranged on the first end cover 1, the strength of the outlet port 25 may be affected as the first end cover 1 is thinner.

Figure 7:
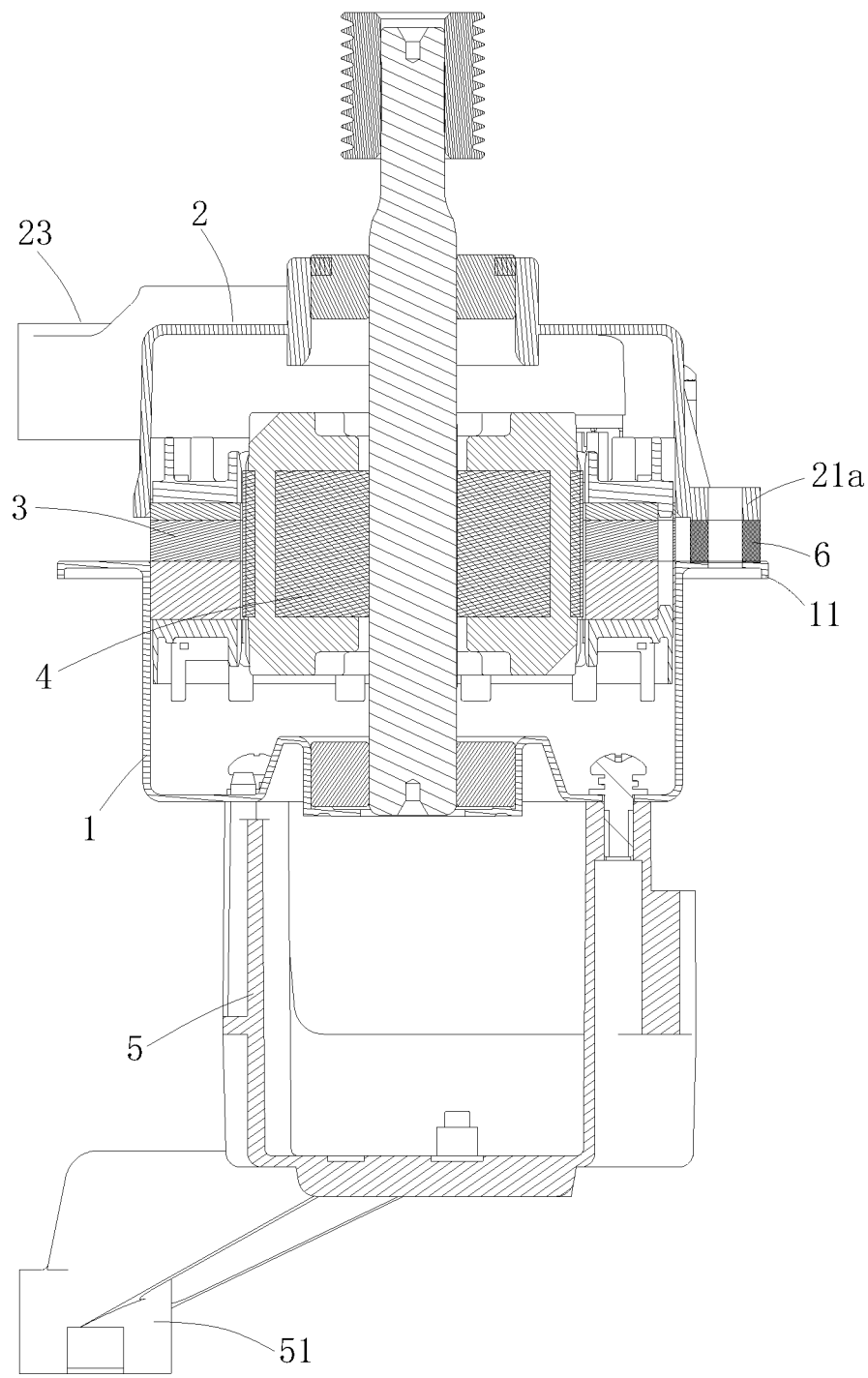
FIG. 7 is a cross-sectional view of the electric motor of the third type in accordance with an embodiment of the present application.

Referring to FIG. 7, according yet another exemplary embodiment of the present application, an electric motor is provided. The electric motor of this embodiment differs from the last embodiment in that: the support installation portion is formed separately from the first flange portion 11 and the second flange portion 21a, so that the support installation portion may be a support sleeve or a block, which is disposed between the first flange portion 11 and the second flange portion 21a. The support sleeve or the block is provided with a second connection hole 3310 for the fastener to pass through. Even if the support installation portion is configured to be a support sleeve or a block, the effect of supporting the first flange portion 11 can also be achieved.

Optionally, the support installation portion can be a support block 6, a side of the support block 6 facing the second flange portion 21a has a first positioning portion, and the second flange portion 21a is correspondingly provided with a second positioning portion. The first positioning portion and the second positioning portion are plugged into each other, such that relative positions of the support block 6 and the second flange portion 21a in the circumferential direction are fixed to prevent the stator assembly 3 from rotating. The outer contour shapes of the first positioning portion and the second positioning portion are matched. The first positioning portion may be a groove or a through hole, and the second positioning portion may be a convex rib, a convex column, etc. Alternatively, the second positioning portion may be a groove or a through hole, and the first positioning portion may be a convex rib, a convex column, etc.

Figure 8:
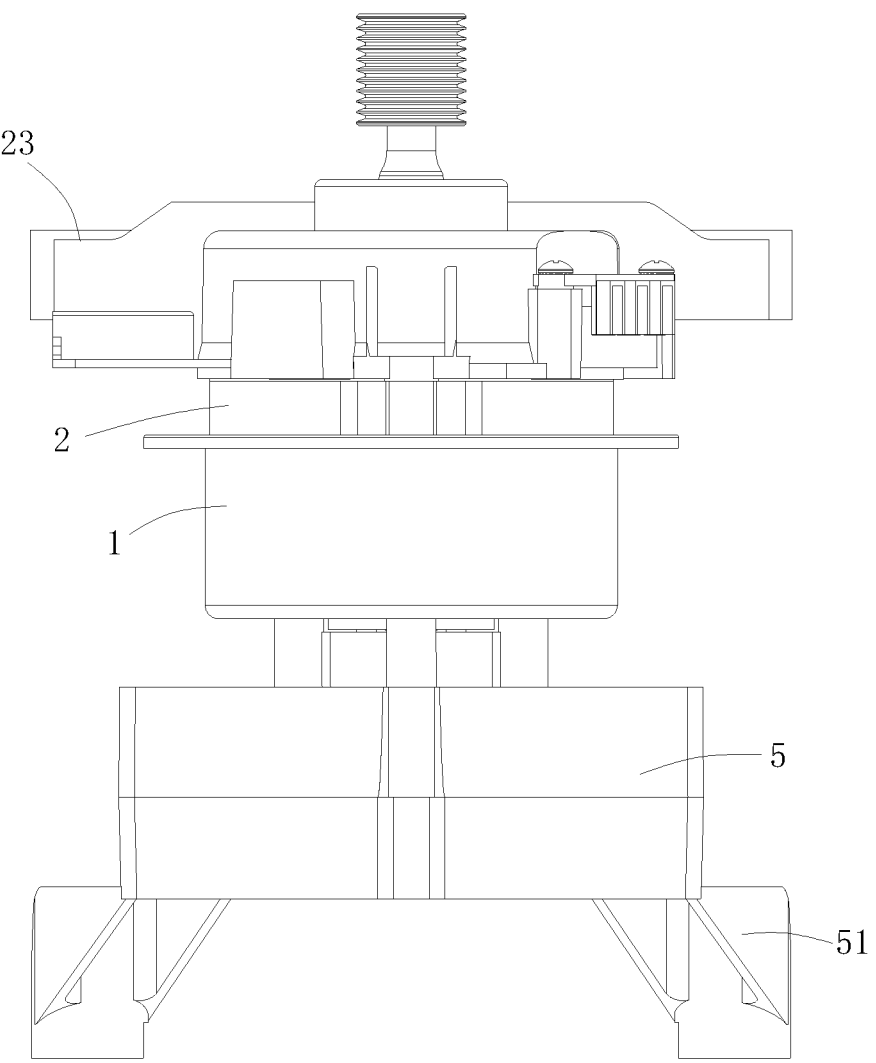
FIG. 8 is a front view of an electric motor of a fourth type in accordance with an embodiment of the present application.
Figure 9:
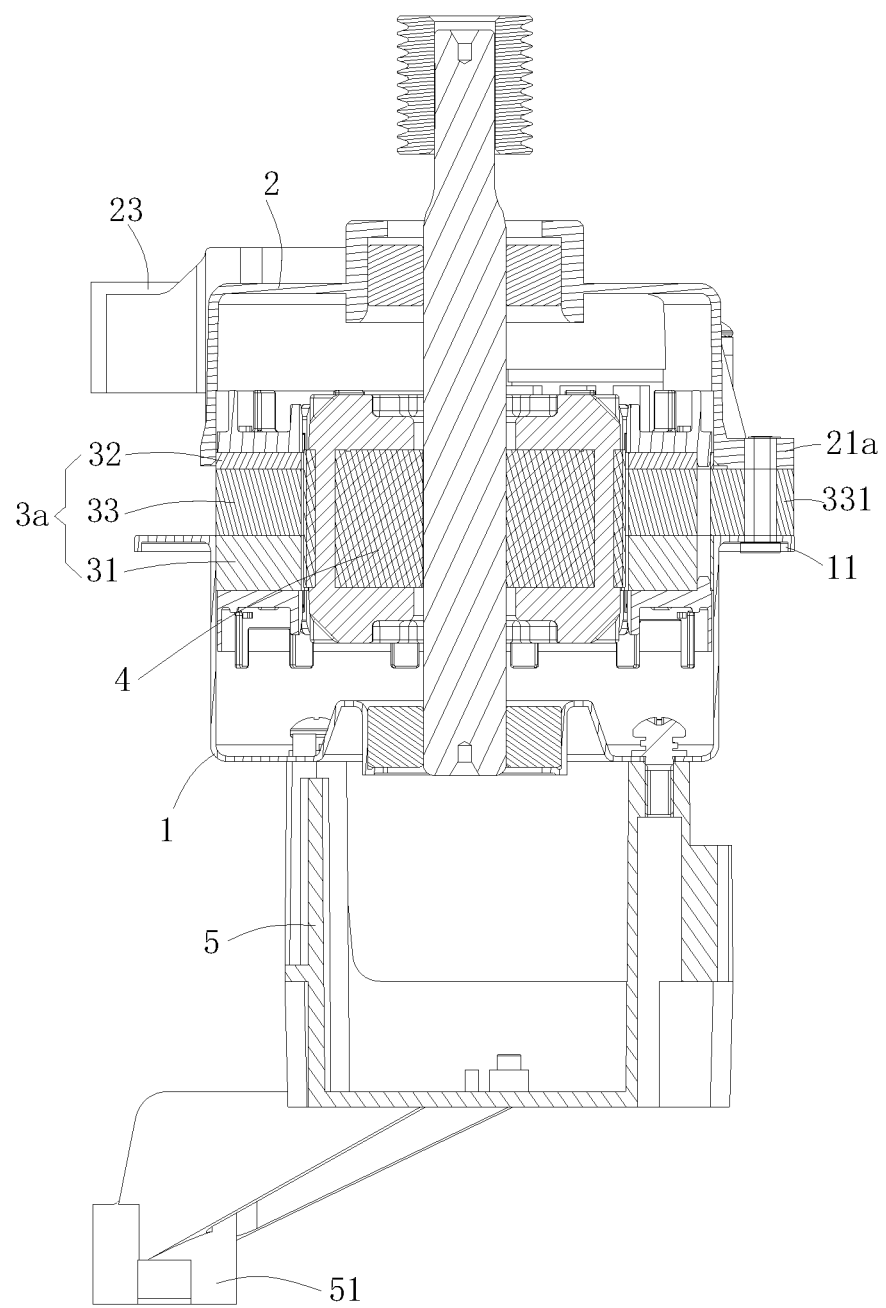
FIG. 9 is a cross-sectional view of the electric motor of the fourth motor in accordance with an embodiment of the present application.

Referring to FIGS. 8 and 9, according to still another embodiment of the present application, an electric motor is provided. The electric motor of this embodiment differs from the first embodiment in that: the electric motor also includes a controller and a controller cover 5. The controller cover 5 is fixed on the first end cover 1. The controller is disposed inside the controller cover 5. The controller may be fixed on the first end cover 1, fixed on the controller cover 5 or pressed by the controller cover 5 on the first end cover 1. An outer side of the controller cover 5 is provided with a second installation foot 51, in this way, it may not be necessary to provide a mounting structure on the first end cover 1, when an electric motor is fixed to an external structure such as a water storage bucket, so that the structure of the first end cover 1 is simplified by using processes such as stretching and injection molding. The second installation foot 51 are transferred and arranged on the controller cover 5, so that not only the controller and the electric motor can form an integrated structure, but also the structure of the first end cover 1 can be simplified, saving the cost of the first end cover 1. The first installation foot 23 and the second installation foot 51 are jointly mounted on the external structure, so that an installation of the electric motor is more stable. The first installation foot 23 and the second installation foot 51 may be provided with installation holes for mounting connection components such as screws.

Optionally, a surface of the controller cover 5 is provided with heat dissipation ribs to enhance heat dissipation of the controller cover 5.

Optionally, the controller cover 5 and the second installation foot 51 are separately formed or integrally formed. The controller cover 5 may be injection-molded from a bulk molding material, a resin material, or the like. The second installation foot 51 may be made of an aluminum alloy, a bulk molding material, a resin material and other materials.

According to another aspect of the present application, a washing machine is provided, which includes the electric motor according to any of the above-discussed embodiments. The electric motor includes a first end cover 1, a second end cover 2, a fastener for connecting the first end cover 1 and the second end cover 2, a stator assembly and a rotor assembly 4. The first end cover 1 is formed by stretching or injection molding, having a thinner wall thickness and lower strength. The first end cover 1 is provided with a first flange portion 11 configured for connecting the fastener, and the second end cover 2 is provided with a second flange configured for connecting the fastener. By providing a support installation portion between the first flange portion and the second flange portion, the first end cover can be prevented from being squeezed and deformed during assembly. Additionally, by matching the first mating surface 12 of the inner wall of the first end cover 1 with the second mating surface 311 of the outer circumference of the stator assembly and pressing against with each other, the stator assembly can be wrapped, which strengthens the strength of the stator assembly and reduces the noise of the stator assembly during operation of the electric motor.

Optionally, the washing machine also includes a water storage bucket, and the electric motor is fixed on the water storage bucket through the above-mentioned first installation foot 23 and second installation foot 51.

The aforementioned are only optional embodiments of the present application, and are not intended to limit the present application. For those skilled in the art, various modifications and variations of this application may be possible. Any modification, equivalent replacement, improvement, etc. made within the spirit and principle of this application shall be included within the protection scope of the claims in the present application.

What is claimed is:

1. An electric motor comprising:
   a first end cover comprising a plurality of first flange portions;
   a second end cover comprising a plurality of second flange portions;
   a stator assembly comprising a plurality of iron cores and a plurality of support installation portions disposed on one of the plurality of iron cores, the plurality of support installation portions having unequal angular separations therebetween;
   a plurality of fasteners disposed through the first flange portions of the first end cover, the support installation portions of the one of the plurality of iron cores, and the second flange portions of the second end cover; and
   a rotor assembly,
   wherein:
   the stator assembly and the rotor assembly are at least partially in respective chambers formed by the first end cover and the second end cover,
   the support installation portions are between the first flange portions and the second flange portions, and
   the fasteners fasten the first flange portions, the support installation portions, and the second flange portions to each other.

2. The electric motor according to claim 1, wherein:
   an inner wall of the first end cover has a first mating surface,
   an outer periphery of the stator assembly has a second mating surface, and
   the first mating surface abuts the second mating surface.

3. The electric motor according to claim 1, wherein:
an end surface of the first flange portion facing the support installation portion is a third mating surface,
a distance between an end surface of the stator assembly inside the first end cover and the third mating surface is H1,
a thickness of the stator assembly is H2, and
H1>2 mm, H2<60 mm, and H1<H2.

4. The electric motor according to claim 1, wherein:
the plurality of iron cores comprises a middle iron core, a first side iron core, and a second side iron core,
the first side iron core and the second side iron core are disposed on opposite sides of the middle iron core, and
the support installation portions are disposed at radially outward positions of the middle iron core.

5. The electric motor according to claim 4, wherein:
the first side iron core is in the first end cover,
the second side iron core is in the second end cover,
an outer periphery of the second side iron core has a fifth mating surface of an arc-shape,
an inner wall of the second end cover has a sixth mating surface of an arc-shape, and
central axes of the fifth mating surface and the sixth mating surface coincide with each other.

6. The electric motor according to claim 1, wherein:
first connection holes are defined in the first flange portions,
second connection holes are defined in the support installation portions,
third connection holes are defined in the second flange portions, and
the fasteners extend through the first connection holes, the second connection holes, and the third connection holes.

7. The electric motor according to claim 1, wherein:
the plurality of support installation portions comprise three support installation portions,
a first angular separation between a first installation support portion of the plurality of support installation portions and a second support installation portion of the plurality of support installation portions is between 10 and 175 degrees, and
a second angular separation between the second support installation portion and a third support installation portion of the plurality of support installation portions or between the third support installation portion and the first support installation portion is between 60 and 200 degrees.

8. The electric motor according to claim 7, wherein the first angular separation and the second angular separation are not equal.

9. The electric motor according to claim 7, wherein:
the first angular separation is between 85 and 95 degrees, and
the second angular separation is between 130 and 140 degrees.

10. The electric motor according to claim 6, wherein:
a maximum distance between outer edges of the support installation portions and a center axis of the stator assembly is D1,
a distance between centers of the second connection holes and the center axis of the stator assembly is D2, and
$0.5 < D2/D1 < 1$.

11. The electric motor according to claim 6, wherein:
an outer side of the second end cover is provided with a first installation foot configured to connect the electric motor to an external structure, and
at least one of the second flange portions is integrally formed with the first installation foot.

12. The electric motor according to claim 11, wherein:
the outer side of the second end cover is provided with a water baffle configured to impede a flow of water, and
the water baffle is connected to a side wall of the first installation foot.

13. The electric motor according to claim 1, wherein:
sides of the support installation portions facing the second flange portions have first positioning portions,
the second flange portions are provided with second positioning portions, and
the first positioning portions and the second positioning portions are plugged into each other.

14. The electric motor according to claim 1, wherein the first flange portions are portions of a single first flange.

15. The electric motor according to claim 1, wherein the second flange portions are portions of a single second flange.

16. The electric motor according to claim 1, wherein the one of the plurality of iron cores is thicker than the plurality of first flange portions.

17. The electric motor according to claim 1, wherein the first end cover is made of a metal material, a bulk molding compound, or a resin material.

18. The electric motor according to claim 1, wherein:
the electric motor further comprises a controller and a controller cover,
the controller is inside the controller cover,
the controller cover is fixedly connected to the first end cover, and
a side of the controller cover facing away from the first end cover has a second installation foot configured to connect the electric motor to an external structure.

19. A washing machine, comprising an electric motor, the electric motor comprising:
a first end cover comprising a plurality of first flange portions;
a second end cover comprising a plurality of second flange portions;
a stator assembly comprising a plurality of iron cores and a plurality of support installation portions disposed on one of the plurality of iron cores, the plurality of support installation portions having unequal angular separations therebetween;
a plurality of fasteners disposed through the first flange portions of the first end cover, the support installation portions of the one of the plurality of iron cores, and the second flange portions of the second end cover; and
a rotor assembly,
wherein:
the stator assembly and the rotor assembly are at least partially in respective chambers formed by the first end cover and the second end cover,
the support installation portions are between the first flange portions and the second flange portions, and
the fasteners fasten the first flange portions, the support installation portions, and the second flange portions to each other.

* * * * *